(12) United States Patent
Oka

(10) Patent No.: US 8,084,131 B2
(45) Date of Patent: Dec. 27, 2011

(54) TRANSPARENT HYBRID SHEET

(75) Inventor: Wataru Oka, Kobe (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 0 days.

(21) Appl. No.: 12/601,414

(22) PCT Filed: May 8, 2008

(86) PCT No.: PCT/JP2008/058523
§ 371 (c)(1),
(2), (4) Date: May 12, 2010

(87) PCT Pub. No.: WO2008/143003
PCT Pub. Date: Nov. 27, 2008

(65) Prior Publication Data
US 2010/0216912 A1    Aug. 26, 2010

(30) Foreign Application Priority Data

May 24, 2007    (JP) ................................ 2007-138012

(51) Int. Cl.
*B32B 27/38*    (2006.01)
*B32B 27/04*    (2006.01)
*B32B 27/20*    (2006.01)
*B32B 17/04*    (2006.01)
*C08L 63/00*    (2006.01)

(52) U.S. Cl. ..................... 428/413; 428/297.4; 523/427; 523/466

(58) Field of Classification Search ............... 428/297.4, 428/413; 523/400, 427, 466; 528/219, 271
See application file for complete search history.

(56) References Cited

U.S. PATENT DOCUMENTS

2010/0249341 A1*    9/2010    Sato et al. ..................... 525/523

FOREIGN PATENT DOCUMENTS

| JP | 6-337408 | 12/1994 |
| JP | 2001-59014 | 3/2001 |
| JP | 2001-59015 | 3/2001 |
| JP | 2004-51960 | 2/2004 |
| JP | 2004-233851 | 8/2004 |
| JP | 2005-146258 | 6/2005 |
| JP | 2005-206787 | 8/2005 |
| JP | 2005-240028 | 9/2005 |
| JP | 2006-176586 | 7/2006 |
| WO | WO 2008004504 A1 * | 1/2008 |

OTHER PUBLICATIONS

PCT Notification of Transmittal of Translation of the International Preliminary Examination Report (Form PCT/IB/338) mailed Jan. 21, 2010.
PCT Written Opinion of the International Searching Authority (Form/ISA/237) dated Jan. 21, 2010.

\* cited by examiner

*Primary Examiner* — Michael J Feely
(74) *Attorney, Agent, or Firm* — Smith, Gambrell & Russell, LLP

(57) ABSTRACT

There is provided a transparent hybrid sheet having superior transparency and thermal resistance and having smaller linear expansion coefficient and optical anisotropy and higher degree of flatness. In a transparent hybrid sheet obtained by curing a hybrid composition including an epoxy resin composition containing alicyclic epoxy compound and a curing agent and curing a glass filler together, the alicyclic epoxy compound contains, as a principal component thereof, a diepoxybicyclohexyl compound represented by Formula (1) below, with amounts of isomers of the diepoxybicyclohexyl compound being 20% or less, of a sum of the diepoxybicyclohexyl compound and the isomers, in terms of a ratio of its peak area determined by a gas chromatography.

[Formula 1]

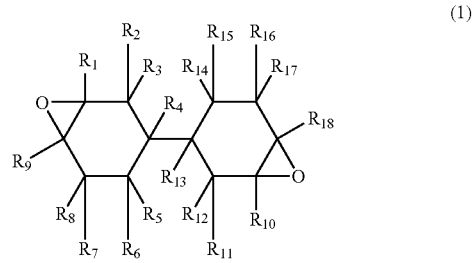

(1)

11 Claims, 2 Drawing Sheets

[Fig 1]
(a)
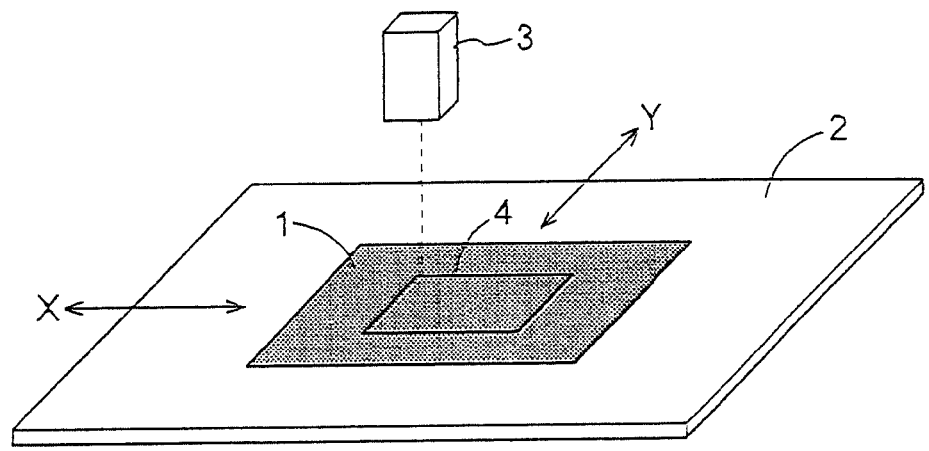
(b)
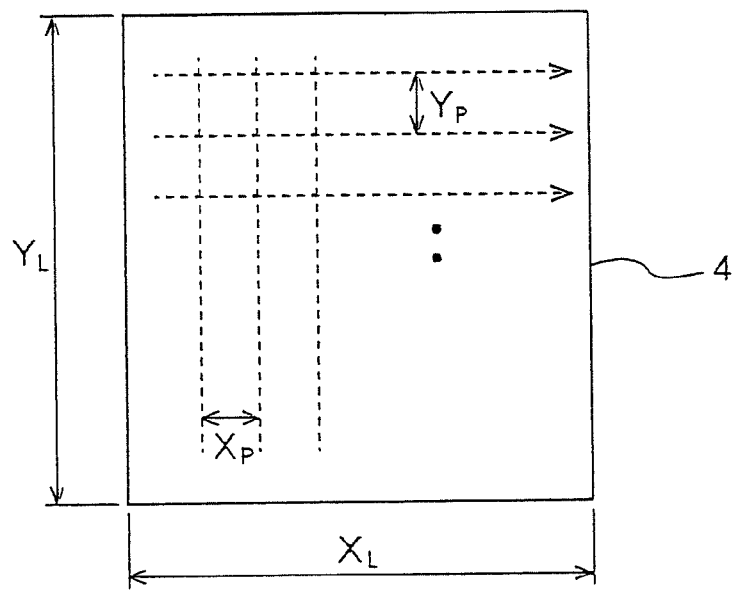

[Fig 2]
(a)
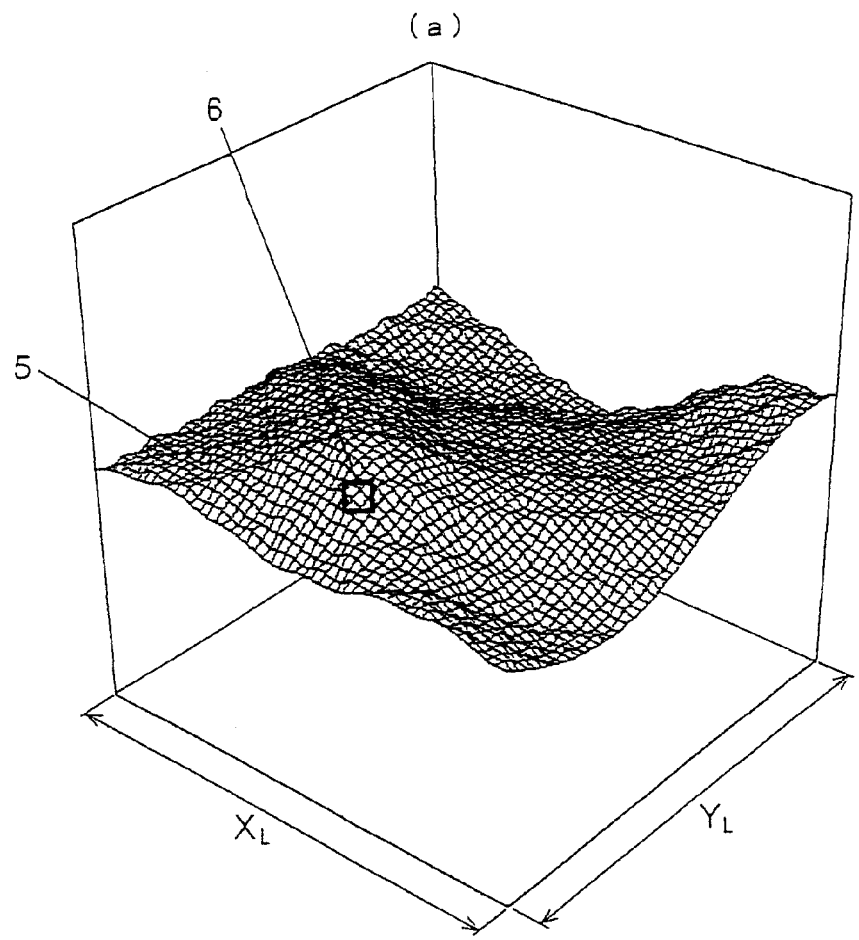
(b)
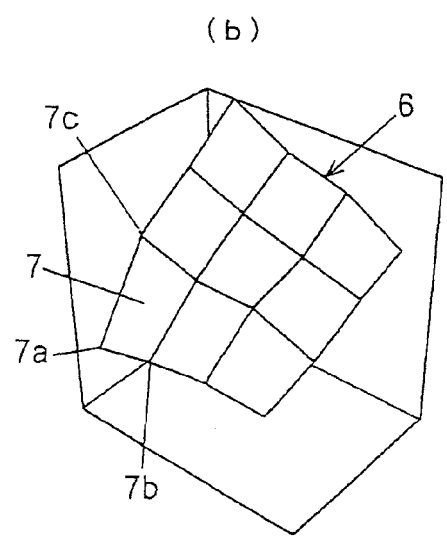

TRANSPARENT HYBRID SHEET

TECHNICAL FIELD

The present invention relates to a transparent hybrid sheet.

BACKGROUND ART

Generally, as a display substrate for LED display devices, organic EL devices, a color filter substrate, a photovoltaic cell substrate, a glass plate is widely employed. However, the glass plate has such disadvantages as being easily broken, being non-bendable, being unsuitable for weight reduction due to its large specific weight. Therefore, plastic materials have been considered, as substitutes therefor.

As resin compositions for use in display device plastic substrates, there are known a resin composition comprising alicyclic epoxy resin, alcohol, and a curing catalyst (see e.g. Patent Document 1), a resin composition comprising alicyclic epoxy resin, a curing agent based on acid anhydride, partially esterified with alcohol, and a curing catalyst (see e.g. Patent Document 2), a resin composition comprising alicyclic epoxy resin, a curing agent based on acid anhydrite containing carboxylic acid (see e.g. Patent Document 3), etc. However, the plastic substrates formed of such resin compositions have significantly greater linear expansion coefficients than a thin film of Si or the like to be laminated thereon. For this reason, such mismatch of linear expansion coefficient causes thermal stress, strain, cracking and/or interfacial delamination of the formed layer, which cause, in turn, warp in the plastic substrates (see e.g. Non-Patent Document 1).

In view of the above, in recent years, it has been proposed to employ a transparent hybrid sheet consisting of a resin composition that contains alicyclic epoxy resin having an ester group, bisphenol A type epoxy resin, an acid anhydrate based curing agent, and a catalyst, and a glass cloth (see e.g. Patent Document 4), a transparent hybrid sheet consisting of a resin composition that contains alicyclic epoxy resin having an ester group, epoxy resin having a dicyclopentadiene skeleton and acid anhydride based curing agent and a glass cloth (see. e.g. Patent Document 5) or a transparent hybrid sheet consisting of bisphenol A type epoxy rein, bisphenol A novolac type epoxy resin and acid anhydride based curing agent and a glass cloth (see e.g. Patent Document 6).

With these transparent hybrid sheets, it is possible to reduce significantly the linear expansion coefficient, as compared with the plastic substrates formed of the resin compositions described in Patent Documents 1-3 described above. Yet, when these transparent hybrid sheets are put into use as display device plastic substrates, there occurs reduction in the display performance, due to the insufficient thermal resistance and significant optical anisotropy of the resins and due to the low flatness thereof, there also occur such problems as deterioration in the display quality.

To cope with these problems, the art has been studying the possibility of using 3,4,3',4'-diepoxybicyclohexyl compound in the resin composition for use in the transparent hybrid sheet, in order to improve its properties as a display device plastic substrate (see e.g. Patent Document 7). Such transparent hybrid sheet as this is superior to the above-described transparent hybrid sheets disclosed in Patent Documents 4-6, in each and every respect of the thermal resistance, optical anisotropy and flatness.

Patent Document 1: Japanese Patent Application "Kokai" No. 6-337408
Patent Document 2: Japanese Patent Application "Kokai" No. 2001-59015
Patent Document 3: Japanese Patent Application "Kokai" No. 2001-59014
Patent Document 4: Japanese Patent Application "Kokai" No. 2004-51960
Patent Document 5: Japanese Patent Application "Kokai" No. 2005-146258
Patent Document 6: Japanese Patent Application "Kokai" No. 2004-233851
Patent Document 7: Japanese Patent Application "Kokai" No. 2005-206787
Non-Patent Document 1: *"Monthly Display"* January, 2000 issue, p. 35.

DISCLOSURE OF INVENTION

As described above, the transparent hybrid sheet formed of the resin composition containing 3,4,3',4'-diepoxybicyclohexyl compound and a glass cloth is superior in the respects of linear expansion coefficient, the transparency, thermal resistance, optical anisotropy, flatness, and so on.

Recently; however, for further improvement in the properties of the display device plastic substrates, there has been a need for even further improvement in even such transparent hybrid sheet including a resin composition containing 3,4,3', 4'-diepoxybicyclohexyl compound and a glass cloth.

The present invention has been made in view of the above-described object and its object is to provide a transparent hybrid sheet having even superior transparency and thermal resistance and having even smaller linear expansion coefficient and optical anisotropy and even higher degree of flatness.

For accomplishing the above-noted object, according to the characterizing feature of the transparent hybrid sheet relating to the present invention, in a transparent hybrid sheet obtained by curing a hybrid composition including an epoxy resin composition containing alicyclic epoxy compound and a curing agent and a glass filler together, said alicyclic epoxy compound contains, as a principal component thereof, a diepoxybicyclohexyl compound represented by Formula (1) below, with amounts of isomers of said diepoxybicyclohexyl compound being 20% or less, of a sum of said diepoxybicyclohexyl compound and said isomers, in terms of a ratio of its peak area determined by a gas chromatography.

[Formula 1]

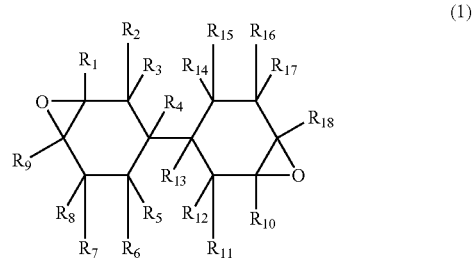

(1)

(where, $R_1$-$R_{18}$, which may be same or different, comprise either hydrocarbon groups that may contain a hydrogen atom, a halogen atom, an oxygen atom, or alkoxyl groups that may contain a substitution group).

The 3,4,3',4'-diepoxybicyclohexyl compound represented by Formula (1) above exists as a mixture of isomers having epoxy groups at different positions in the cyclohexane ring.

Then, in the inventive construction, the diepoxybicyclohexyl compound is contained as the principal component and there is employed an alicyclic epoxy compound with amounts of isomers of the diepoxybicyclohexyl compound being 20% or lower, of a sum of the diepoxybicyclohexyl compound and the isomers, in terms of a ratio of its peak area determined by a gas chromatography. Such alicyclic epoxy compound, as compared with those with the amounts of isomers exceeding 20%, has a higher curing reaction rate, and higher glass transition temperature and improved physical properties such as thermal resistance, and have also superior curing performance at low temperatures and lower linear thermal expansion coefficient after curing.

Therefore, according to the inventive construction, there can be obtained a transparent hybrid sheet having even superior transparency and thermal resistance and having even smaller linear expansion coefficient and optical anisotropy and even higher degree of flatness.

Preferably, in the transparent hybrid sheet relating to the present invention, said alicyclic epoxy compound is obtained by epoxidizing alicyclic diene compound containing as a principal component thereof bicyclohexyl diene compound represented by Formula (3) below which is obtained by a dehydration reaction of dihydroxy bicyclohexyl compound represented by Formula (2) below in an organic solvent under presence of a dehydrating catalyst, with concurrent distillation-removal of water byproduced.

[Formula 2]

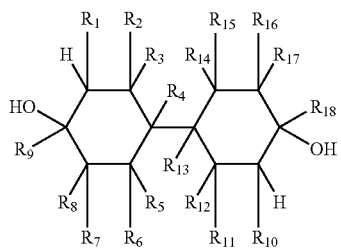

(2)

(where, $R_1$-$R_{18}$, which may be same or different, comprise either hydrocarbon groups that may contain a hydrogen atom, a halogen atom, an oxygen atom, or alkoxyl groups that may contain a substitution group).

[Formula 3]

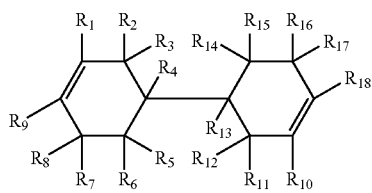

(3)

(where, $R_1$-$R_{18}$, which may be same or different, comprise either hydrocarbon groups that may contain a hydrogen atom, a halogen atom, an oxygen atom, or alkoxyl groups that may contain a substitution group).

The bicyclohexyl-3,3'-diene compound represented by Formula (3) is produced by a dehydration reaction of 4,4'-hydroxy bicyclohexyl compound represented by Formula (2). In this, with the presence of byproduced water, addition of water and desorption of water take place repeatedly, whereby isomers with double bonds shifted in positions too are produced. For this reason, 3,4,3',4'-diepoxybicyclohexyl compound represented by Formula (1) too becomes a mixture with isomers with epoxy groups thereof being at different positions on the cyclohexane ring.

Then, in the case of the inventive construction, the alicyclic diene compound is produced by a dehydration reaction of the dihydroxy bicyclohexyl compound in an organic solvent under presence of a dehydrating catalyst, with concurrent distillation-removal of byproduced water. This makes it possible to reduce the amount of isomers in the alicyclic diene compound. Therefore, when this alicyclic diene compound is epoxidized, there can be obtained diepoxybicyclohexyl compound with lower isomer content.

Therefore, according to the inventive construction, it is possible to provide a transparent hybrid sheet having superior transparency and thermal resistance and having smaller linear expansion coefficient and optical anisotropy and higher degree of flatness.

Preferably, in the transparent hybrid sheet relating to the present invention, said curing agent contains a cationic curing catalyst. This makes it possible to cure the epoxy resin composition at a lower temperature. As a result, the interfacial stress between the glass filler and the epoxy resin composition can be reduced, the optical anisotropy of the transparent hybrid sheet can be reduced and also the flatness thereof can be further enhanced. Moreover, if the epoxy resin composition is cured with using such cationic curing catalyst, it is possible to further increase the post-curing thermal resistance (e.g. glass transition temperature).

Preferably, in the transparent hybrid sheet relating to the present invention, said epoxy resin composition contains a compound capable of cationic polymerization. With this, while the high thermal resistance and transparency and low optical anisotropy, and high degree of flatness are maintained, the matrix resin in the transparent hybrid sheet can be highly expansive, so that the strain that occurs with stress application will be smaller and the adhesive contact between the glass filler and the matrix resin can be improved. As a result, it becomes possible to reduce the risk of interfacial delamination and improve the flexibility and impact resistance. Preferably, such compound capable of cationic polymerization is at least a compound selected from the group consisting of a compound having an epoxy group, a compound having an oxetanyl group, and a compound having a vinyl ether group.

Preferably, in the transparent hybrid sheet relating to the present invention, the amount of the filler contained therein ranges from 1 to 90 wt. % relative to the transparent hybrid sheet. If the amount of glass filler is within this range, molding of the sheet is easy and there is found an effect of reducing the linear expansion coefficient due to the hybridization. Further, the uniformity of the amount of resin per unit volume can be improved, so that there can be achieved improvement in the uniformity of stress, and undulation in the transparent hybrid sheet can be reduced.

Preferably, in the transparent hybrid sheet relating to the present invention, a difference between a refraction index after the curing of said epoxy resin composition and a refraction index of said glass filler is 0.01 or less. With this, the transparent hybrid glass obtains even higher transparency.

Preferably, in the transparent hybrid sheet relating to the present invention, said glass filler comprises glass fiber cloth. With use of such glass fiber cloth such as glass cloth, glass non-woven cloth, the linear expansion coefficient reducing effect can be enhanced.

Preferably, in the transparent hybrid sheet relating to the present invention, said transparent hybrid sheet has a light transmittance at 400 nm wavelength of 80% or more. This is advantageous in case the sheet is employed as a display device substrate.

Preferably, in the transparent hybrid sheet relating to the present invention, said transparent hybrid sheet has an average linear expansion coefficient at 30° C. to 250° C. of 40 ppm or less. This is advantageous in case the sheet is employed for optical application.

Advantageously, the transparent hybrid sheet of the present invention can be used as a display device substrate.

BRIEF DESCRIPTION OF THE DRAWINGS

FIG. 1 is a schematic view of a surface profile determining apparatus, and

FIG. 2 is a substrate surface view determined by the surface profile determining device.

BEST MODE OF EMBODYING THE INVENTION

A transparent hybrid sheet relating to the present invention is obtained by curing a hybrid composition that contains an epoxy resin composition containing alicyclic epoxy compound and a curing agent and glass filler together.

The alicyclic epoxy compound employed in the invention contains, as a principal component thereof, 3,4,3',4'-diepoxybicyclohexyl compound represented by the Formula (1) and the amounts of isomers of the diepoxybicyclohexyl compound are 20% or lower, preferably 18% or lower, more preferably 16% or lower, of a sum of the diepoxybicyclohexyl compound and the isomers, in terms of a ratio of its peak area determined by a gas chromatography.

Such alicyclic epoxy compound, as compared with those with the amounts of isomers exceeding 20%, has a higher curing reaction rate, and much higher glass transition temperature and much improved physical properties such as thermal resistance, and have also superior curing performance at low temperatures and lower linear thermal expansion coefficient after curing. Hence, with the transparent hybrid sheet using such alicyclic epoxy compound, the interfacial stress between the glass filler and the matrix resin of the cured epoxy resin composition can be reduced. As a result, it becomes possible to reduce the optical anisotropy and improve the degree of flatness of the hybrid sheet.

In the Formula (1) above, the halogen atom includes a fluorine atom, a chlorine atom, a bromine atom, and an iodine atom. The hydrocarbon group is not particularly limited, but includes aliphatic hydrocarbon group, alicyclic hydrocarbon group, and aromatic hydrocarbon group. Some non-limiting examples of the aliphatic hydrocarbon group are linear or branched groups such as methyl group, ethyl group, propyl group, isopropyl group, alkenyl groups such as vinyl group, allyl group, alkynyl groups such as ethynyl group. Some non-limiting examples of the alicyclic hydrocarbon group are cycloalkyl groups such as cyclopentyl group and cyclohexyl group, cycloalkenyl group, cross-linked cyclic group. Some non-limiting examples of the aromatic hydrocarbon group are phenyl, naphthy groups. Some non-limiting examples of the hydrocarbon group having an oxygen atom are alkokyl alkyl groups such as methoxymethyl group, ethoxymethyl group, etc. Some non-limiting examples of the hydrocarbon group having a halogen atom are chloromethyl group, trifluoromethyl group, chlorophenyl group, etc. Some non-limiting examples of alkoxy group are methoxy, ethoxy, propyloxy, isopropyloxy, butyloxy group, etc. A non-limiting example of substitution group having an alkoxy group is a halogen atom, etc.

In this way, as 3,4,3',4'-diepoxybicyclohexyl compound, various derivatives represented by the Formula (1) can be used suitably. More preferably, the advantageous effect is even greater with use of a compound having $R_1$-$R_{18}$ all being hydrogen atoms.

Preferably, the analysis of the contents of the isomers of the 3,4,3',4'-diepoxybicyclohexyl compound is effected by means of a gas chromatography using a capillary column having a high resolution power. Exemplary determination conditions thereof will be explained next.

Determining Apparatus: HP6890 (manufactured by Hewlett-Packard Co.)
column: HP-5, length 30 m, membrane thickness 0.25 μm, inner diameter 0.32 mm, liquid phase 5%-diphenyl-95% dimethylpoly siloxane
carrier gas: nitrogen
carrier gas flow rate: 1.0 ml/min.
detector: FID
entry temperature: 250° C.
detector temperature: 300° C.
temperature elevation pattern (column): kept 2 min. at 100° C., heated to 300° C. at 5° C./min, kept 10 min. at 30° C.
split ratio: 100
sample: 1 μl (epoxy compound:acetone=1:40)

In the transparent hybrid sheet according to the present invention, as the alicyclic epoxy compound, there can be employed, for instance, one obtained by epoxidizing alicyclic diene compound containing as a principal component thereof bicyclohexyl diene compound represented by the Formula (3) which is obtained by a dehydration reaction of dihydroxyl bicyclohexyl compound represented by the Formula (2) in an organic solvent under presence of a dehydrating catalyst, with concurrent distillation-removal of byproduced water. With this, the amount of isomers (isomers having double bonds at different positions) of the diene compound can be less than 20% of the sum of the diene compound and the isomers, in terms of a ratio of its peak area determined by a gas chromatography. Therefore, by epoxidizing this diene compound, there can be obtained alicyclic epoxy compound with extremely low contents of isomers.

The method of manufacturing the alicyclic epoxy compound employed in the present invention comprises the following steps, for instance.
(I) a step of effecting a dehydration reaction on the dihydroxyl bicyclohexyl compound represented by the Formula (2) by heating it to 130° C. to 200° C. at a pressure exceeding 20 Torr (2.67 kPa) in an organic solvent under presence of a dehydrating catalyst, with concurrent distillation-removal of byproduced water;
(II) a step of distilling the diene compound represented by the Formula (3) generated by heating the reaction mixture solution from the above step (I) to 100° C. to 200° C. at a pressure exceeding 200 Torr (26.7 kPa); and
(III) a step of epoxidizing the diene compound made at the above step (II).

First, at step (I), a dehydration reaction is effected on the dihydroxyl bicyclohexyl compound represented by the Formula (2), with concurrent removal of byproduced water therefrom.

The organic solvent used at step (I) is not particularly limited, but can be any solvent that is inactive under the reaction conditions. Preferably, it is a solvent that is in liquid form at 25° C. and that has a boiling point of from 120 to 200° C. approximately. Some non-limiting examples thereof are aromatic hydrocarbons such as xylene, cumene, pseudocumene, and aliphatic hydrocarbons such as dodecane, undecane, etc. Further, an organic solvent that is azeotropic with water and that can be liquid-separated from water, can be advantageously employed, since byproduced water can be easily separated and removed therefrom. However, using a solvent such as ketone, esters, etc. that exhibit reactivity in the presence of acid is not preferred even if its boiling point is within the above-specified range. Further, alcohols are not preferred either, since they can induce a dehydration reaction.

The amount of the organic solvent can be appropriately determined, in consideration to e.g. the operability, reaction rate, etc. For instance, for 100 weight parts of the dihydroxy bicyclohexyl compound represented by the Formula (2) as the based, from 50 to 1000 weight parts, preferably from 80 to 800 weight parts, more preferably from 100 to 500 weight parts, of the solvent is to be contained.

The dehydrating catalyst used at the step (I) is not particularly limited, as long as it is in liquid form or can be dissolved in the reaction solution under the above reaction conditions. However, it is preferred that the catalyst have no or as low as possible activity for the reaction solvent. As a dehydrating catalyst that is in the liquid form under the reaction conditions, a catalyst which is finely dispersed within the reaction liquid is preferred. And, as a dehydrating catalyst that is dissolved in the reaction solution, a catalyst that can be completely dissolved by an amount to be described later. in the reaction solution is preferred. Some non-limiting examples are inorganic acids such as phosphoric acid, sulfuric acid, acids such as p-toluene sulfonic acid, benzene sulfonic acid, naphthalene sulfonic aid, or salts thereof, in particular, neutral salts obtained by neutralization of the mentioned acids with organic bases. Here, the term "neutral salt" can be either complete neutralization salts or partial neutralization salts. Among these, sulfuric acid such as p-toluene sulfonic acid, and neutralization salts obtained by neutralization of the sulfonic acid with an organic base, in particular, partial neutralization salts are preferred. And, these dehydrating catalysts can be used either singly or in combination of two or more kinds thereof.

Incidentally, if ammonium hydrogen sulfate is employed as the dehydrating catalyst, it is possible to obtain one in which the amount of isomers of the diene compound relative to the sum of the diene compound and the isomers is about 19% as a ratio in the peak area determined by the gas chromatography.

In case a neutralization salt from an organic base of the above-cited acids is employed as the dehydrating catalyst, not only separated and refined neutralization salt of the reaction mixture resulting from the reaction between the acid and the organic base, but also this reaction mixture per se can directly be employed. In this case, the acid and the organic base can be added separately so that the neutralization salt may be formed within the reaction system. In the case of using directly the reaction mixture, free acid may be contained in this reaction mixture. In that case, the mixture ratio between the acid and the organic base may be 0.01 to 1 mol, preferably 0.05 to 0.5 mol, more preferably 0.1 to 0.47 mol, relative to 1 mol of acid. Especially, in the case of using a reaction mixture of sulfuric acid and an organic base, the ratio of the organic base will be set as 0.02 to 2 mol, preferably 0.1 to 1.0 mol, more preferably 0.2 to 0.95 mol.

The organic base is not particularly limited, but can be any organic solvent that exhibits basicity. Preferably, it has a pKa value of 11 or greater and a boiling point of 150° C. or higher. Some non-limiting examples thereof include amines (especially, tertiary amines), nitrogen-containing aromatic heterocyclic compounds, guanidines, hydrazines. Some non-limiting examples thereof include 1,8-diazabicyclo[5.4.0]undecene-7 ("DBU" for short, hereinafter), 1,5-diazabicyclo[4.3.0]nonene-5 ("DBN" for short, hereinafter), 1,4-diazobicyclo[2.2.2]octane, piperidine, N-methyl piperidine, pyrrolidine, N-methylpyrrolidine, triethylamine, triethylenediamine, tributylamine, trioctylamine, benzyldimethylamine, 4-dimethylaminopyrizine, N—N-dimethyl aniline, etc. And, as some non-limiting examples of the nitrogen containing aromatic heterocyclic compounds, there can be cited pyridine, collidine, imidazole, etc. Among these, the tertiary amines (cyclic) such as DBU, DBN, triethylamine, triethylenediamine, and guanidines, and hydrazines, are particularly preferred. And, DBU, DBN, triethylamine, triethylenediamine are more preferred.

The amount of the dehydrating catalyst to be used can be appropriately set, in consideration to operability, reaction rate, etc. For instance, the amount will be set as 0.001 to 0.5 mol, relative to 1 mol of the dihydroxy bicyclohexyl compound represented by the Formula (2) as the base. And, the amount is preferably from 0.001 to 0.3 mol, more preferably from 0.005 to 0.2 mol.

At the step (II), a dehydration reaction is carried out by heating at 130 to 200° C. under a pressure exceeding 20 Torr (2.67 kPa), with concurrent distillation removal of byproduced water. In the reaction solution at step (I), there are co-existent non-reacted 4,4'-dihydroxybicyclohexyl compound, a reaction intermediate product formed by one of two cyclohexane rings to which the hydroxyl groups in the 4,4'-dihydroxy bicyclohexyl compound are bonded, has dehydrated within the molecule to be changed into a cyclohexane ring, bicyclohexyl-3-3'-diene compound as the target compound, byproduced water, the dehydrating catalyst, and the reaction solvent. And, at the step (I), the byproduced water is removed by distillation. In this, distillation removal of the reaction intermediate product is not desirable for the reasons (a), (b) below.

(a) The reaction intermediate product can be converted into the target compound through further intra-molecular dehydration. So, removal of this, if done, will result in disadvantageous reduction in the yield of the target compound.

(b) The reaction intermediate compound is generally a solid having sublimating property. So, in case a distillation tower is provided at this step, the solid will be deposited in the distillation removal path of the byproduced water, thereby to block this distillation removal path, thus inviting pressure build-up inside the reaction vessel. As a result, this will invite such troubles as burst, damage of the reaction vessel, scattering of the reaction liquid, etc.

For the reasons described above, at step (I), it is necessary to carry out the dehydration reaction with distillation removal of water, at such a pressure not to cause distillation removal of the reaction intermediate product.

Therefore, the pressure used in the operation at the step (I) is set to be 20 Torr or higher and also lower than the normal pressure, that is, 2.67 kPA or higher and also lower than 0.1 MPa. More preferably, it is set to 100 Torr or higher and lower than the normal pressure, i.e. higher than 13.3 kPa and lower than 0.1 Mpa, even more preferably to 200 Torr or higher and lower than the normal pressure. That is, it is set to be 26.7 kPa or higher and lower than 0.1 Mpa. From the viewpoint of operability, the normal pressure, i.e. 0.1 MPa is particularly preferred.

And, respecting the reaction temperature used at step (I), if this temperature is too high, a side reaction will occur, which leads to yield reduction. Whereas, if the temperature is too low, this will decrease the reaction rate. Therefore, the temperature is set from 130 to 200° C., preferably from 145 to 195° C., more preferably from 150 to 195° C.

Further, the reaction time period used at step (I) can be appropriately set in consideration to the operability, the reaction rate, etc. For instance, in the case of about 3 L of synthesis, the period will be set from 1 to 10 hours, preferably from 2 to 6 hours approximately.

At step (II), from the reaction mixture solution after the distillation removal of the byproduced water, the target compound, i.e. the diene compound, is distilled. In this, while it is possible to put the reaction mixture solution obtained at step (I) directly to use at step (II), it is also possible to subject this solution first to such operations as extraction, water-washing, humoral regulation, and then use it at step (II). Further, if the boiling point of the organic solvent employed at step (I) is lower than the boiling point of the diene compound, i.e. target compound, it is preferred that the diene compound be distilled after distillation removal of the organic solvent therefrom.

At step (II), the operation is carried out at a pressure of 200 Torr (26.7 kPa) or lower. At step (II), the reaction intermediate product described hereinbefore hardly exists in the reaction liquid. Therefore, even if the pressure is lowered, there occurs no such problem as the blockage of the distillation path described above. On the other hand, if the pressure is high, the distillation of the target compound will take a long time. For this reason, it is preferred that this pressure be set lower than the pressure employed at step (I). Specifically, the difference between the pressure at step (I) and the pressure at step (II) will be set 100 Torr or greater, i.e. 13.3 kPa or greater, preferably 200 Torr or greater, i.e. 26.7 kPa or greater, even more preferably 50 Torr or greater, i.e. 66.7 kPa or greater. Therefore, the pressure used at step (II) will be set e.g. from 3 to 200 Torr, i.e. from 0.40 to 26.7 kPa, preferably from 3-100 Torr, i.e. from 0.40 to 13.3 kPa, more preferably from 3 to 20 Torr, i.e. from 0.40 to 2.67 kPa.

Regarding the reaction temperature employed at step (II), if this is too high, a side reaction will occur, thus resulting in reduction in the yield. If it is too low, the distillation rate will be lower. Therefore, this temperature is set at 100 to 220° C., preferably at 120 to 180° C., more preferably at 130 to 150° C.

For the distillation of the diene compound and the like, a distillation apparatus can be added to the reaction vessel for instance. As this distillation apparatus, any distillation apparatus commonly employed in this technical field and capable of providing a needed reflux ratio can be used without any particular limitation, such as a charging tower, an Oldershaw type distillation apparatus, etc.

The diene compound distilled at step (II) above can be further refined when needed. As a method of refining, if the compound contains a trace amount of water, this can be separated with utilization of specific weight difference. However, refining by distillation is preferred.

In the above-described method, the dihydroxy bicyclohexyl compound is reacted in an organic solvent under the predetermined reaction conditions, in the presence of a dehydrating catalyst which is in liquid form or is dissolved in the reaction liquid, with concurrent distillation removal of byproduced water. Then, the resultant diene compound is distilled under the predetermined conditions. This allows the reaction to proceed at a relatively low temperature and to be completed within a short period of time, so that side reaction such as isomerization, etc. can be restricted and also loss of the target compound due to distillation of reaction intermediate product and blockage due to sublimation of reaction intermediate product can be prevented. Consequently, high-purity diene compound with reduced amount of impurities can be obtained easily and in high yield. That is to say, it is possible to obtain one in which the amount of isomers of the diene compound relative to the sum of the diene compound and the isomers is less than 20%, e.g. 19.5% or less, preferably, 15% or less. as a ratio in the peak area determined by the gas chromatography.

Preferably, the analysis of the amounts of the isomers of the diene compound is effected by a gas chromatography using a capillary column having high resolution. power.

Determining Apparatus: HP6890 (manufactured by Hewlett-Packard Co.)
column: HP-5, length 60 m, inner diameter 0.32 mm, liquid phase 5%-diphenyl-95% dimethylpoly siloxane
carrier gas: nitrogen
carrier gas flow rate: 2.6 ml/min.
detector: FID
entry temperature: 250° C.
detector temperature: 250° C.
temperature elevation pattern (column): kept 5 min. at 60° C., heated to 300° C. at 10° C./rain,
split ratio: 100
sample: 1 μl (epoxy compound:acetone=1:40)

The epoxidization of the diene compound made at step (III) is not particularly limited and this can be any conventional method in the pertinent art. For instance, some exemplary methods are a method using organic percarboxylic acid as an oxidizing agent (epoxidizing agent), a method using a metal compound, e.g. t-butyl hydroperoxido, hydroperoxide and molybdenum compound. In view of the safety, economy, and yield, the method using organic percarboxylic acid is preferred. Next, this method using organic percarboxylic acid will be explained in details.

As organic percarboxylic acid, e.g. performic acid, peracetic acid, perbenzoic acid, perisobutyric acid, trifluoro peracetic acid, etc. can be used. In particular, peracetic acid is a preferred epoxidizing agent because of its high reactivity and high stability Especially, using a substantially water-free organic carboxylic acid is particularly preferred, since it makes it possible to obtain a compound having high epoxidization ratio. A specific example is an organic carboxylic with water content of less than 0.8 wt. %, preferably, less than 0.6 wt. %. The substantially water-free organic carboxylic acid suitable for use in the present invention can be manufactured by e.g. air oxidization of aldehydes, e.g. acetaldehyde. For instance, substantially water-free peracetic acid can be manufactured by methods disclosed in German Patent Application Publication No. 1418465 and the Japanese Patent Application "Kokai" No. 54-3006.

The amount of the epoxidizing agent employed at step (III) can be set appropriately in consideration to the operability, the reaction rate, etc. and is not particularly limited in the invention. For instance, it may be decided, depending on each individual epoxidizing agent, the reactivity of bicyclohexyl-3,3'-diene compound, etc. Specifically, the amount of the epoxidizing agent will be set to 1.0 to 3.0 mol, preferably, 1.05 to 1.5 mol, relative to 1 mol of unsaturated group. However, using 3.0 mol or more amount of epoxidizing agent is not desirable in view of the economy and possibility of inducing side reaction.

The epoxidizing reaction at step (III) will be carried out with adjustment of the use of solvent, the reaction temperature, depending on the apparatus, the physical properties of the raw materials employed. The solvent can be used for the purpose of e.g. stabilization through reduction in the viscosity of the raw materials, dilution of the epoxidizing agent. For instance, if peracetic acid is employed as the epoxidizing agent, esters, aromatic compounds, ethers can be used. Preferred examples thereof are ethyl acetate, hexane, cyclohexane, toluene, benzene, etc, and ethyl acetate is particularly preferred.

Further, the reaction temperature of the epoxidization will be determined, depending on e.g. the reactivity between the epoxidizing agent employed and the diene compound. In the case of using peracetic acid, temperature from 20 to 70° C. is preferred. On the other hand, a temperature lower than 20° C. is not preferred since the reaction will be slow and a temperature exceeding 70° C. is not preferred either, since the peracetic acid will be dissolved exothermically.

No special operation is needed for the crude liquid obtained by the epoxidization reaction. For instance, the crude liquid may be stirred for 1 to 5 hours for aging. Separation of the epoxy compound from the resultant crude liquid can be effected by any method known in the pertinent art. For instance, this can be a method of precipitating the compound in poor solvent, a method of distilling away the solvent by charging the epoxy compound in hot water and stirring them together, a method of direct solvent removal and a method of separating the compound by distillation purification, etc.

Through the above-described steps, there is obtained a diepoxybicyclohexyl compound with low isomer contents. That is, the amounts of the isomers of the diepoxybicyclohexyl compound represented by the Formula (1) can be 20% or less of the sum of the diepoxybicyclohexyl and its isomers, as a ratio of the peak area determined by a gas chromatography.

The curing agent contained in the epoxy resin composition used in the transparent hybrid sheet relating to the present invention is not particularly limited. Some non-limiting examples of the curing agent include cross-linking agents such as acid anhydride, aliphatic amines, etc., cationic curing catalysts, anionic curing catalysts. Among these, a resin which can be cured with using a cationic curing catalyst is preferred. If the curing of aliphatic epoxy resin is effected with using a cationic curing catalyst, the resin materials can be cured at a lower temperature. As a result, it becomes possible to reduce the interfacial stress between the glass filler and the matrix resin and to reduce the optical anisotropy and increase the degree of flatness of the hybrid sheet. Further, if the epoxy resin composition is cured with using a cationic curing catalyst, it is possible to increase the thermal resistance after the curing (e.g. glass transition temperature) than the one cured with using other curing agent (e.g. acid anhydrate). A possible and theoretically non-limiting explanation of this is that the crosslinking density resulting from curing with using a cationic curing catalyst is higher than the crosslinking density resulting from curing with using other curing agent (e.g. acid anhydrate).

Some non-limiting specific examples of the cationic during catalyst include thermo cationic curing catalysts (e.g. onium salt based cationic curing catalyst, aluminum chelate based cationic curing catalyst) that discharge a substance for initiating cationic polymerization upon being heated, light cationic curing catalysts (e.g. onium salt based cationic curing catalyst) that discharge a substance for initiating cationic polymerization upon being exposed to active energy radiation. Among these, the thermo cationic curing catalysts are particularly preferred. With this, there can be obtained a cured product having even superior thermal resistance.

Some non-limiting examples of the thermo cationic curing catalysts include aromatic sulfonium salt, aromatic iodonium salt, ammonium salt, aluminum chelate, boron trifluoride amine complex, etc. Specifically, examples of the aromatic sulforic acid salt are SI-60L, SI-80L, SI-100L manufactured by Sansin Chemical Industry, and hexafluoro antimonate such as SP-66, SP-77 manufactured by ADEKA, etc. Some non-limiting examples of aluminum chelate include ethyl acetoacetate aluminum diisopropylate, aluminum tris(ethyl acetoacetate), etc. Some non-limiting examples of boron trifluoride amine complex include boron trifluoride monoethylamine complex, boron trifluoride imidazole complex, boron trifluoride piperidine complex. A non-limiting example of the photo cationic curing catalyst is SP170 manufactured by ADEKA inc.

The amount of the cationic catalyst is not particularly limited, but it is from 0.1 to 5 weight parts, preferably from 0.5 to 3 weight parts, relative to 100 weights of the aliphatic epoxy compound. If the amount is within this range, there can be obtained one with no reduction in the curing performance and high transparency. Further, in the case of light curing, it is possible to employ in combination, if needed, a sensitizing agent, an acid proliferating agent for promoting the curing reaction.

The epoxy resin composition used in the present invention can further contain a component capable of cationic polymerization. Preferably, such component capable of cationic polymerization is at least one of a compound having an epoxy group, a compound having an oxetanyl group, and a compound having a vinyl ether group. And, this can be used singly or as a mixture of one or more kinds in combination.

The sole requirement for the compound containing an epoxy group capable of cationic polymerization is that it contain at least one epoxy group in its molecule. Hence, various kinds of epoxy resins can be employed. For instance, as some non-limiting examples of glycidyl type epoxy resin, there can be cited bisphenol-A epoxy resin, bisphenol-F epoxy resin, bisphenol-S epoxy resin, naphthalene type epoxy resin or water-added matters of these, epoxy resins having dicyclopentadiene skeleton, epoxy resins having a poly siloxane skeleton, epoxy resins having a triglycidyl isocyanurate group, epoxy resins having a cardo skeleton, epoxy resins having a polysiloxane group. etc. Some non-limiting examples of alicyclic epoxy resins include 3,4-epoxycyclohexylmethyl-3',4'-epoxycyclohexanecarboxylate, 1,2,8,9-diepoxylimonen, ∈-captolactone oligomer with 3,4-epoxycyclohexylmethanol and 3,4-epoxycyclohexane carbonic acid ester-bound to opposed terminals thereof, epoxy resins having water-added bisphenol-A skeleton, etc.

The compound having an oxetanyl group as a component capable of cationic polymerization is not particularly limited. Some non-limiting examples are 1,4-bix{[(3-ethyl-3-oxetanyl)methoxy]methyl}benzene (Aron Oxetane OXT-121 (XDO)), di[2-(3-oxyetanyl)butyl]ether (Aron Oxetane OXT-221 (DOX)), 1,4-bis[(3-ethyloxetane-3-il)methoxy]benzene (HQOX), 1,3-bis[(3-ethyl oxetane-3-il)methoxy: benzene (RSOX), 1,2-bis[(3-ethyl oxetane-3-il)methoxy]benzone (CTOX), 4-4'-bis[(3-ethyl oxetane-3-il)methoxy]biphenyl(4, 4'-BPDX), 2,2'-bis[(3-ethyl-3-oxetanyl)methoxy]biphenyl (2,2'-BPDX), 3,3',5,5'-tetramethyl[4,4'-bis(3-ethyl oxetane-3-il)methoxy]biphenyl (TM-BPDX), 2,7-bis[(3-ethyl oxetane-3-il)methoxy]biphenyl (TM-BPDX), 2,7-bis[(3-ethyl oxetane-3-il)methoxy]naphthalene (2,7-NpDOX), 1,6-bis[(3-ethyl oxetane-3-il)methoxy]-2,2,3,3,4,4,5,5-oxtafluorohexane (OFH-DOX), 3 (4), 8(9), -bis[(1-ethyl-3-oxetanyl) methoxymethy]-tricycle[5.2.1.0$^{2.6}$]decane, 1-2-bis[2-{(1-ethyl-3-oxyetanyl)methoxy}ethylhio]ethane, 4,4'-bis[(1-ethyl-3-oxyetanyl)methyl]thiobenzene thio ether, 2,3-bis[(3-ethyl oxytane-3-il)methoxymethyl]norbornane (NDMOX), 2-ethyl-2-[(3-ethyl oxetane-3-il)methoxymethyl]-1,3-O-bis [(1-ethyl-3-oxyetanyl)methyl]-propane-1,3-diol (TMP-TOX), 2,2-dimethyl-1,3-O-bis{(3-etyloxetane-3-il)methyl}-propane-1,3-diol (NPGOX), 2-butyl-2-ethyl-1, [(3- ethyloxetane-3-il)methyl]-propane-1,3-diol, 1,4-O-bis[(3-ethyloxetane-3-il)methyl]-butane-1,4-diol, 2,4,6-O-tris[(3-ethyl oxetane-3-il)methyl]cyanuric acid, ether compound (BisAOX) of bisphenol-A and 3-ethyl-3-chloromethyl oxetane (OXC), ether compound (Bis FOX) of bisphenol-F and OXC, ester compound (PNOX) of phenol black and OXC, ether compound (CNOX) of cresol black novolac and OXC, oxetanycil oxetanyl silsesquioxane (OX-SQ), silicon alkoxid (OX-SC) of 3-ethyl-3-hydroxymethyl oxetane, 3-ethyl-3-(2-ethyhexyloxymethyl)oxytane (Aron oxyetane OXT-212 (EHOX)), 3-ethyl-3-(dodecyl methyl)oxetane (OXR-12), 3-ethyl-3-(octadecyloxymethyl)oxetane (OXR-18), 3-ethyl-3-(phenoxymethyl)oxetane (Aron oxetane OXT-211 (PDX)), 3-ethyl-3-hydroxymethyl oxetane (OXA), 3-(cyclohexyloxy)methyl-3-ethyl oxetane (CHOX), etc. Here, the signs within the parentheses are commercial product names or abbreviations provided by TOA GOSEI Co., Ltd.

The compound having a vinyl ether group as a component capable of cationic polymerization is not particularly limited, but as some non-limiting examples thereof, there can be cited 2-hydroxyethyl vinyl ether, diethylene glycol monovinyl ether, 4-hydroxy butylvinyl ether, diethyleneglycolmonovinyl ether, triethyleneglycoldivinyl ether, cyclohexane dimethanol divinyl ether, cyclohexane dimethanol monovinyl ether, tricyclo decane vinyl ether, cyclohexyl vinyl ether, methoxy ethyl vinyl ether, ethoxy ethyl vinyl ether, pentaerythritol type tetravinyl ether, etc.

The ratio between the aliphatic epoxy compound and the component capable of cationic polymerization for use in the epoxy resin composition employed in the present invention ranges preferable from 99:1 to 70:30 in terms of weight ratio. If the ratio of the component capable of cationic polymerization is within this range, the expansion coefficient of the matrix resin can be large with maintaining high thermal resistance and transparency and low optical isotropy and flatness, so that the strain in response to application of stress will be small, thus improving the contact at the interface between the glass filler and the matrix resin. As a result, the interfacial delamination or separation between the glass filler and the matrix resin will hardly occur, whereby the flexibility and the impact resistance can be improved.

The glass filler employed in the present invention is not particularly limited. However, glass fiber cloth such as glass cloth, glass non-woven cloth is preferred because of its high effect of reducing the linear expansion coefficient. Respecting the types of glass, various conventional types of glass such as E glass, C glass, A glass, S glass, T glass, D glass, NE glass, quartz, low dielectric constant glass, high dielectric constant glass, can be employed; thus, the type is not particularly limited. Among these, however, E glass, S glass, T glass, NE glass, etc. are preferred since these have lower content of ionic impurities such as alkaline metals, and they are readily available.

The refraction index of the glass filler is not particularly limited in the case of the diameter thereof is 100 nm or less, since the diffusion at the interface between the glass filler and the matrix resin is lessened. If the diameter of the glass filler exceeds 100 nm, in order to restrict occurrence of diffusion, the refraction index ranges preferably from 1.4 to 1.6, more preferably from 1.5 to 1.55.

Further, in the transparent hybrid sheet of the present invention, it is preferred that the difference between the refraction index of the matrix resin formed of the cured epoxy resin composition and that of the glass filler be 0.01 or less, more preferably 0.005 or less. If the refraction index difference is greater, this tends to result in deterioration in the transparency of the transparent hybrid sheet obtained. In order to control the refraction index difference between the matrix resin and the glass filler, the above-described component capable of cationic polymerization can be added appropriately to the epoxy resin composition.

The amount of the glass filler preferably ranges from 1 to 90 wt. % relative to the transparent hybrid sheet, more preferably from 10 to 80 wt. %, even more preferably from 30 to 70 wt. % relative to the same. If the amount of glass filler is within this range, the molding is easy and there is observed linear expansion coefficient reducing effect due to the hybridization. Also, respecting the amount of glass filler, when this amount is relatively large, there is achieved improvement in the uniformity of the resin amount per unit volume, so the uniformity of the stress is improved. As a result, the undulation in the transparent hybrid sheet is reduced.

In the transparent hybrid sheet of the present invention, there may be employed in combination, if needed, an oligomer or monomer of a thermoplastic resin or thermosetting resin or a coupling agent, within a range not to impair its properties such as the transparency, the solvent resistance, low thermal property, optical properties, flatness, etc. In case these oligomer, monomer or coupling agent are employed, it is necessary to adjust the composition ratio so that the total refraction index thereof may be in agreement with the refraction index of the glass filler. Further, the epoxy resin composition in the present invention may additionally contain a trace amount of anti-oxidant, ultraviolet absorbing agent, a dying agent, other inorganic filler, within a rang not to impair its properties such as the transparency, the solvent resistance, low thermal property, optical properties, flatness, etc.

There is no particular limitation in the method of manufacturing the transparent hybrid sheet of the present invention. Some non-limiting examples of the method include a method comprising directly mixing uncured epoxy resin composition and the glass filler, introducing the resultant mixture into a mold required and then crosslinking it to form it into a sheet, a method comprising dissolving uncured epoxy resin composition in the solvent, dispersing the glass filler therein and casting the resultant mixture and then crosslinking it to form it into a sheet, a method comprising preparing varnish comprised of uncured epoxy resin composition in a solvent, impregnating a glass cloth or glass non-woven cloth with the resultant vanish and crosslinking it to form it into a sheet, etc.

The transparent hybrid sheet of the present invention can be used for such optical applications as an LED display device plastic substrate, a color filter substrate, an organic EL display device plastic substrate, an electronic paper substrate, a photovoltaic cell substrate, a touch panel, etc. And, in such cases, the thickness of the sheet ranges preferably from 40 to 200 μm, more preferably from 50 to 100 μm.

In case this transparent hybrid sheet is used for optical applications, it is preferred that its average linear expansion coefficient at 30° C. to 250° C. be 40 ppm or lower, more preferably 20 ppm or lower, even more preferably 10 ppm or lower. And, its glass transition temperature ranges preferably 200° C. or higher, more preferably 250° C. or higher.

In case the inventive transparent hybrid sheet is used as a display device substrate, its total light transmittance at the wavelength of 400 nm is preferably 80% or higher, more preferably 85% or higher, even more preferably 88% or higher. If the total light transmittance at the 400 nm wavelength is insufficient, there arises the risk of the display performance being insufficient.

In case the inventive transparent hybrid sheet is used as a display device substrate, in order to further improve the degree of flatness, resin coating layers may be provided on opposed sides of the substrate. As a resin used for forming such coating layers, it is preferred that the resin have distinguished thermal resistance, transparency and chemical resistance. Specifically, an epoxy resin composition containing diepoxybicyclohexyl compound represented by the Formula (1) and the curing agent is preferred. The thickness of the coating layer ranges preferably from 0.1 μm to 30 μm, more preferably from 0.5 to 30 μm.

Next, the contents of the present invention will be explained in greater details with reference to some examples. It is understood that the present invention is not limited to these examples as long as changes to be made thereto do not exceed the essential elements thereof.

Synthesis of Epoxy Resins Having Different Isomer Contents

Synthesis Example 1

Isomer Content 9%

70 g (0.68 mol) of 95 wt. % sulfuric acid and 55 g (0.36 mol) of 1,8-diazabicyclo[5.4.0]undecene-7 (DBU) were mixed and stirred together to prepare a dehydrating catalyst. In to a 3-liter flask equipped with a stirring device, a thermometer, and a dehydrating pipe and a heated distillation-removal pipe, 1000 g (5.05 mol) of water-added bisphenol (4,4'-dihydroxybicyclohexyl) with $R_1$ to $R_{18}$ all being hydrogen atoms and 125 g of the dehydrating catalyst prepared as above (0.68 mol as sulfuric acid) and 1500 g of pseudocumene were charged and the flask was heated. When the inner temperature has exceeded 115° C. approximately, production of water was observed. With continued temperature elevation, the temperature was elevated to the boiling point of pseudocumene (inner temperature 162 to 170° C.), and a dehydration reaction was conducted at the normal pressure. Byproduced water was distilled away and discharged through the dehydrating pipe to the outside of the system. Incidentally, the dehydrating catalyst was in liquid form under the reaction conditions and finely dispersed within the reaction liquid. After lapse of 3 hours, a substantially theoretical amount of water (180 g) had been distilled away, so it was determined that the reaction was complete. From the resultant solution after completion of the reaction, pseudocumene was distilled away with using a 10-stage Oldershaw type distillation apparatus. Then, this was distilled at an internal pressure of 10 Torr (1.33 kPa) and inner temperature of 137 to 140° C., whereby 731 g of bicyclohexyl-3,3'0diene with R1-R18 being hydrogen atoms in the Formula (3) above was obtained. A GC analysis revealed that the bicyclohexyl-3,3'-diene contained its isomers (ascertained by GC-MS analysis) and the ratio between the bicyclohexyl-3,3'-diene and its isomers was 91:9.

243 g of the bicyclohexyl-3,3'-diene (including the isomers) and 730 g of ethyl acetate were charged into a reactor and with introduction of nitrogen into the gas phase portion, and with the temperature within the reaction system being controlled to 37.5° C., 274 g of ethyl acetate solution containing 30 wt. % of peracetic acid (water content 0.41 wt. %) was dripped in above 3 hours. After completion of the dripping of peracetic acid solution, 1 hour aging at 40° C. was effected to complete the reaction. Further, the crude liquid with reaction completed at 30° C. was water-washed and low boiling point compounds were removed at 70° C./20 mmHg, whereby 270 g of aliphatic epoxy compound was obtained. In this, the yield was 93%. Determination of its viscosity (25° C.) showed a value of 84 mPa·s. The aliphatic epoxy compound obtained had an oxirane concentration of 15.0 wt. %.

Further, $^1$H-NMR determination conducted showed that a peak attributable to internal double bond in the vicinity of 54.5 to 5 ppm was gone and there appeared a proton peak attributable to the epoxy group in the vicinity of δ 3.1 ppm, thus ascertaining that this was 3,4,3',4'-diepoxybicyclohexyl having $R_1$ to $R_{18}$ being hydrogen atoms in the Formula (1) above. A GC analysis revealed that the aliphatic epoxy compound obtained as above contained 3,4,3',4'-diepoxybicyclohexyl and its isomers, with the amount of the isomers being 9%.

Synthesis Example 2

Isomer Content 14%

In to a 3-liter flask equipped with a stirring device, a thermometer, and a dehydrating pipe and a heated distillation-removal pipe, 840 g (4.24 mol) of water-added bisphenol like the Synthesis Example 1 above, 170 g of phosphoric acid (1.73 mol), and 2350 g of undecane were charged and the flask was heated. When the inner temperature has exceeded 110° C. approximately, production of water was observed. With continued temperature elevation, the temperature was elevated to the boiling point of undecane (inner temperature 189 to 194° C.), and a dehydration reaction was conducted at the normal pressure. Byproduced water was distilled away and discharged through the dehydrating pipe to the outside of the system. Incidentally, it was observed that phosphoric acid was completely dissolved in the reaction liquid under the reaction conditions. After lapse of five and a half hours, a substantially theoretical amount of water (150 g) had been distilled away, so it was determined that the reaction was complete. From the resultant solution after completion of the reaction, undecane was distilled away with using a 10-stage Oldershaw type distillation apparatus. Then, this was distilled at an internal pressure of 10 Torr (1.33 kPa) and inner temperature of 138 to 141° C., whereby 474.2 g of bicyclohexyl-3,3'-diene was obtained. A GC analysis revealed that the bicyclohexyl-3,3'-diene contained its isomers and its isomers and the ratio between the bicyclohexyl-3,3'-diene contained its isomers was 87:13

243 g of the bicyclohexyl-3,3'-diene (including the isomers) obtained as above and 730 g of ethyl acetate were charged into a reactor and with introduction of nitrogen into the gas phase portion, and with the temperature within the reaction system being controlled to 37.5° C., 274 g of ethyl acetate solution containing 30 wt. % of peracetic acid (water content 0.41 wt. %) was dripped in over 3 hours. After completion of the dripping of peracetic acid solution, 1 hour aging at 40° C. was effected to complete the reaction. Further, the crude liquid with reaction completed at 30° C. was water-washed and low boiling point compounds were removed at 70° C./20 mmHg, whereby 261 g of aliphatic epoxy compound was obtained. In this, the yield was 90%. Determination of its viscosity (25° C.) showed a value of 75 mPa·s. The aliphatic epoxy compound obtained had an oxirane concentration of 15.0 wt. %. Further, $^1$H-NMR determination conducted showed that a peak attributable to internal double bond in the vicinity of δ 4.5 to 5 ppm was gone and there appeared a proton peak attributable to the epoxy group in the vicinity of δ 3.1 ppm, thus ascertaining that this was 3,4,3',4'-diepoxybicyclohexyl. A GC analysis revealed that the aliphatic epoxy compound obtained as above contained 3,4,3',4'-diepoxybicyclohexyl and its isomers, with the amount of the isomers being 14%.

Synthesis Example 3

Isomer Content 17%

In to a 5-liter flask equipped with a stirring device, a 20-stage Oldershaw type distillation tower and a thermometer, 1000 g (5.05 mol) of water-added bisphenol like the Synthesis Example 1 above, 40 g (0.265 mol) of ammonium hydrogen sulfate and 2800 g of cumene were charged and the flask was heated. When the inner temperature has exceeded 115° C. approximately, production of water was observed. With continued temperature elevation, the temperature was elevated to the boiling point of cumene (inner temperature 165 to 170° C.), and a dehydration reaction was conducted at the normal pressure. Byproduced water was distilled away and discharged through the dehydrating pipe to the outside of the system. Incidentally, it was observed that ammonium hydrogen sulfate was in the solid phase under the reaction conditions and most of it remained un-dissolved in the reaction liquid. After lapse of six and a half hours, a substantially theoretical amount 94% of water (170.9 g) had been distilled away, so it was determined that the reaction was complete. After the completion of the reaction, the inside of the system was depressurized and cumene was removed by distillation and then the pressure was reduced to 10 Torr (1.33 kPa) and distillation was effected at the inner temperature of 137 to 141° C., whereby 590 g of bicyclohexyl-3,3'-diene was obtained. A GC analysis revealed that the bicyclohexyl-3,3'-diene contained its isomers and its isomers and the ratio between the bicyclohexyl-3,3'-diene and the isomers was 81:19

243 g of the bicyclohexyl-3,3'-diene (including the isomers) obtained as above and 730 g of ethyl acetate were charged into a reactor and with introduction of nitrogen into the gas phase portion, and with the temperature within the reaction system being controlled to 37.5° C., 274 g of ethyl acetate solution containing 30 wt. % of peracetic acid (water content 0.41 wt. %) was dripped in over 3 hours. After completion of the dripping of peracetic acid solution, 1 hour aging at 40° C. was effected to complete the reaction. Further, the crude liquid with reaction completed at 30° C. was water-washed and low boiling point compounds were removed at 70° C./20 mmHg, whereby 269 g of aliphatic epoxy compound was obtained. In this, the yield was 92%. Determination of its viscosity (25° C.) showed a value of 69 mPa·s. The aliphatic epoxy compound obtained had an oxirane concentration of 14.9 wt. %. Further, $^1$H-NMR determination conducted showed that a peak attributable to internal double bond in the vicinity of δ 4.5 to 5 ppm was gone and there appeared a proton peak attributable to the epoxy group in the vicinity of δ 3.1 ppm, thus ascertaining that this was 3,4,3', 4'-diepoxybicyclohexyl. A GC analysis revealed that the aliphatic epoxy compound obtained as above contained 3,4,3',4'-diepoxybicyclohexyl and its isomers, with the amount of the isomers being 17%.

Comparison Synthesis Example

Isomer Content 21%

6 kg of water-added bisphenol, like the Synthesis Example 1 above, and 620 g of potassium hydrogen sulfate were charged into a 10 liter four-necked flask equipped with a stirring device, a 20-stage distillation tower and a thermometer, and then the flask was heated to 180° C. to dissolve the water-added bisphenol. Then, stirring operation was initiated. The reaction was continued with water being byproduced from the top of the distillation tower. After lapse of 3 hours, the inside of the reaction system was depressurized to 10 Torr (1.33 kPa) and water and the bicyclohexyl-3,3'-diene were continuously distilled away to the outside of the system from the uppermost stage of the distillation tower. The water and the bicyclohexyl-3,3'-diene distilled away to the outside of the system were separated into two layers by a decanter and only the upper layer liquid was taken out. Thereafter, for over 4 hours, the reaction temperature was elevated to 220° C. and when the distillation removal of water and the bicyclohexyl-3,3'-diene was stopped, it was determined that the reaction was complete. The yield of the distillation crude solution of the bicyclohexyl-3,3'-diene was 4507 g. 4500 g of the above-described bicyclohexyl-3,3'-diene crude solution was charged into a 5 liter four-necked flask equipped with a 20-stage distillation tower and a thermometer and this was heated in an oil bath to 80° C. The inside of the reaction system was depressurized to 10 Torr (1.33 kPa) and after distillation removal of water, the temperature of the uppermost stage of the distillation tower was maintained at 145° C. and for over 5 hours at a reflux ratio of 1, distillation refinement of bicyclohexyl-3,3'-diene was conducted, whereby colorless transparent liquid was obtained. The yield was 4353 g. A GC analysis conducted on this liquid showed that the obtained bicyclohexyl-3,3'-diene contained its isomers and its isomers and the ratio between the bicyclohexyl-3,3'-diene and its isomers was 80:20

243 g of the bicyclohexyl-3,3'-diene (including the isomers) obtained as above and 730 g of ethyl acetate were charged into a reactor and with introduction of nitrogen into the gas phase portion, and with the temperature within the reaction system being controlled to 37.5° C., 274 g of ethyl acetate solution containing 30 wt. % of peracetic acid (water content 0.41 wt. %) was dripped in over 3 hours. After completion of the dripping of peracetic acid solution, 1 hour aging at 40° C. was effected to complete the reaction. Further, the crude liquid with reaction completed at 30° C. was water-washed and low boiling point compounds were removed at 70° C./20 mmHg, whereby 267 g of aliphatic epoxy compound was obtained. In this, the yield was 92%. Determination of its viscosity (25° C.) showed a value of 63 mPa·s. The aliphatic epoxy compound obtained had an oxirane concentration of 14.9 wt. %. Further, $^1$H-NMR determination conducted showed that a peak attributable to internal double bond in the vicinity of δ 4.5 to 5 ppm was gone and there appeared a proton peak attributable to the epoxy group in the vicinity of δ3.1 ppm, thus ascertaining that this was 3,4,3',4'-diepoxybicyclohexyl. GC analysis revealed that the aliphatic epoxy compound obtained as above contained 3,4,3',4'-diepoxybicyclohexyl and its isomers, with the amount of the isomers being 21%.

Making of Transparent Hybrid Sheet

Example 1

An NE glass type glass cloth (thickness 95 μm, refraction index 1.510, manufactured by Nitto Boseki Co., Ltd.) was impregnated with resin composition prepared by mixing together 70 weight parts of the alicyclic epoxy compound (isomer content 9%) obtained in Synthesis Example 1, 30 weight parts of oxetanyl silsesquioxane (product name OX-SC, TOAGOSEI Co., Ltd.) and 1 weight pat of aromatic sulforic thermal cationic catalyst (SI-100L from Sansin Chemical Industry) and a defoaming operation was effected thereon. Then, the resultant glass cloth was pinched between glass plates with mold releasing treatment and heated at 80°

C. for 2 hours and then at 250° C. for further 2 hours, whereby a transparent hybrid sheet having a thickness of 97 μm was obtained.

Example 2

An NE glass type glass cloth (thickness 95 μm, refraction index 1.510, manufactured by Nitto Boseki Co., Ltd.) was impregnated with resin composition prepared by mixing together 70 weight parts of the alicyclic epoxy compound (isomer content 14%) obtained in Synthesis Example 2, 30 weight parts of oxetanyl silsesquioxane (product name OX-SC, TOAGOSEI Co., Ltd.) and 1 weight pat of aromatic sulforic thermal cationic catalyst (SI-100L from Sansin Chemical Industry) and a defoaming operation was effected thereon. Then, the resultant glass cloth was pinched between glass plates with mold releasing treatment and heated at 80° C. for 2 hours and then at 250° C. for further 2 hours, whereby a transparent hybrid sheet having a thickness of 97 μm was obtained.

Example 3

An NE glass type glass cloth (thickness 95 μm, refraction index 1.510, manufactured by Nitto Boseki Co., Ltd.) was impregnated with resin composition prepared by mixing together 70 weight parts of the alicyclic epoxy compound (isomer content 17%) obtained in Synthesis Example 3, 30 weight parts of oxetanyl silsesquioxane (product name OX-SC, TOAGOSEI Co., Ltd.) and 1 weight pat of aromatic sulforic thermal cationic catalyst (SI-100L from Sansin Chemical Industry) and a defoaming operation was effected thereon. Then, the resultant glass cloth was pinched between glass plates with mold releasing treatment and heated at 80° C. for 2 hours and then at 250° C. for further 2 hours, whereby a transparent hybrid sheet having a thickness of 97 μm was obtained.

Comparison Example 1

An NE glass type glass cloth (thickness 95 μm, refraction index 1.510, manufactured by Nitto Boseki Co., Ltd.) was impregnated with resin composition prepared by mixing together 70 weight parts of the alicyclic epoxy compound (isomer content 21%) obtained in Synthesis Comparison Example 1, 30 weight parts of oxetanyl silsesquioxane (product name OX-SC, TOAGOSEI Co., Ltd.) and 1 weight pat of aromatic sulforic thermal cationic catalyst (SI-100L from Sansin Chemical Industry) and a defoaming operation was effected thereon. Then, the resultant glass cloth was pinched between glass plates with mold releasing treatment and heated at 80° C. for 2 hours and then at 250° C. for further 2 hours, whereby a transparent hybrid sheet having a thickness of 97 μm was obtained.

The mixing ratios and results of evaluations of the properties of Examples and Comparison Example are shown in Table 1.

The evaluation method is as follows.

(a) Evaluation of Undulation

A laser displacement meter was operated for scanning over the substrate surface for a predetermined determination area $(S_1)$. and an increase ratio $(S_2-S_1)/S_1$ of the substrate surface area $(S_2)$ relative to the determined area was calculated as an undulation characteristic value, this undulation characteristic value was evaluated based on the following criteria.

○: good (undulation characteristic value $1.5 \times 10^{-6}$ or less)
x: poor (undulation characteristic value greater than $1.5 \times 10^{-6}$)

The details of the determining method are as follows. FIG. 1 (a) shows the surface profile determining apparatus. This determining apparatus consists essentially of a fixed laser displacement meter 3 (LT-9030M from Keyence Corporation) and an X-Y autostage 2 (from Corns Co., Ltd.) On the autostage, the substrate 1 is placed and a determining range 4 $[X_L \times Y_L]$ is set. As illustrated in FIG. 1(b), with movement in the X direction of the autostage, the laser displacement meter is operated for scanning for determination of the heights of the substrate surface by a determining pitch $X_p$. By effecting scanning by this determining pitch $X_p$, substrate surface profile data by $X_p, Y_p$ interval are obtained. In this determination, $X_L$ and $Y_L$ were set to 50 mm and $X_p$ and $Y_p$ were set to 0.5 mm, respectively.

FIG. 2(a) shows the substrate surface 5 determined for the predetermined area. For calculation of the surface area of the determined substrate profile, an area of a member consisting of 4 (four) adjacent determination points is obtained. FIG. 2(b) shows, in enlargement, a local portion 6 of the determined surface. In the member 7 consisting of the four adjacent points, a reference point 7a is set. Then, by calculating a height difference Zx between an X-side point 7b and the reference point, the vector $(X_p, 0, Z_x)$ of 7b relative to the reference point is obtained and by calculating a height difference $Z_Y$ between a Y-side point 7c and the reference point, the vector $(0, Y, Z_Y)$ of 7c relative to the reference point is obtained, respectively. Then, the area of the plane defined by these vectors is obtained by obtaining the size of the exterior product that approximates the area of the member 7. In this same manner, the area of each member constituting the determination area is obtained and then by calculating the total sum of these member areas, the surface area $(S_2)$ of the determined substrate is obtained. The greater the degree of flatness of the determined profile, the more approximate the obtained surface area to the determined area $X_L \times Y_L$. So, by subtracting the determination area $(S_1)$ from the calculated surface area $(S_2)$, an increase of the surface area due to undulation is calculated. Then, the value normalized by dividing the increase of surface area $(S_2-S_1)$ by the determination area $(S_1)$ was used as the undulation characteristic value.

(b) Optical Anisotropy

After setting a polarization microscope to the cross-Nicols alignment condition, while the transparent substrate was rotated on the stage, the evaluation was made at the position of the highest light transmittance. Each sign means the following.

○: good (slight light transmittance observed)
x: poor (much light transmittance observed)

(c) Average Linear Expansion Coefficient

A thermal stress-strain gauge, TMA/SS6000 from SEIKO Instruments, Inc. was used and the temperature was elevated in a nitrogen atmosphere at a rate of 5° C./rain. and determination was effected in a tensile mode with the load of 5 g and the average linear expansion coefficient in a predetermined temperature range was calculated.

(d) Thermal Resistance

A dynamic viscoelasticity determining device, DNS210 from SEIKO Instruments, Inc. was used and the maximum value at tan δ at 1 Hz was used as the glass transition temperature (Tg).

(e) Light Transmittance

A spectral photometer, U3200 (from Shimadzu Corporation) was used to determine total light transmittance at 400 nm wavelength.

(f) Refraction Index

An abbe refractometer, DR-M2 from Atago Co., Ltd, was used to determine the refraction index at 589 nm wavelength at 25° C.

TABLE 1

|  |  | Example 1 | Example 2 | Example 3 | Comparison Example 1 |
|---|---|---|---|---|---|
| epoxy resin composition | alicyclic epoxy compound (isomer content) | 70 weight parts (9%) | 70 weight parts (14%) | 70 weight parts (17%) | 70 weight parts (21%) |
|  | oxetanyl silsesquioxane | 30 weight parts | 30 weight parts | 30 weight parts | 30 weight parts |
|  | cationic polymerization catalyst | 1 weight parts | 1 weight parts | 1 weight parts | 1 weight parts |
| glass filler | NE glass (thickness 95 μm) cloth (refraction index 1.510) | 1 sheet | 1 sheet | 1 sheet | 1 sheet |
| transparent hybrid sheet | amount of matrix resin (wt %) | 40 | 42 | 41 | 40 |
|  | refraction index of matrix resin (refraction index difference relative to glass filler) | 1.508 (0.002) | 1.509 (0.001) | 1.506 (0.004) | 1.507 (0.003) |
|  | undulation | ○ | ○ | ○ | X |
|  | optical anisotropy | ○ | ○ | ○ | X |
|  | average linear expansion coefficient (30~250° C.) | 12 ppm | 11 ppm | 12 ppm | 11 ppm |
|  | thermal resistance (glass transition temperature) | >250° C. | >250° C. | >250° C. | >250° C. |
|  | light transmittance (wavelength 400 nm) | 88% | 87% | 87% | 89% |

As described above, it was confirmed that the properties of a transparent hybrid sheet is improved when using alicyclic epoxy compound containing the diepoxybicyclohexyl compound as its principal component and having smaller amount of isomers thereof.

INDUSTRIAL APPLICABILITY

The transparent hybrid sheet according to the present invention may be suitably used in e.g. a transparent plate, an optical lens, an LED display device substrate, a color filter substrate, an organic EL display device substrate, a photovoltaic cell substrate, a touch-panel substrate, a light guide plate, an optical device, an optical waveguide, an LED sealant, etc.

The invention claimed is:

1. A transparent hybrid sheet obtained by curing a hybrid composition including an epoxy resin composition containing alicyclic epoxy compound and a curing agent and a glass filler together,
wherein said alicyclic epoxy compound contains, as a principal component thereof, a diepoxybicyclohexyl compound represented by Formula (1) below, with amounts of isomers of said diepoxybicyclohexyl compound being 20% or less, of a sum of said diepoxybicyclohexyl compound and said isomers, in terms of a ratio of its peak area determined by a gas chromatography:

[Formula 1]

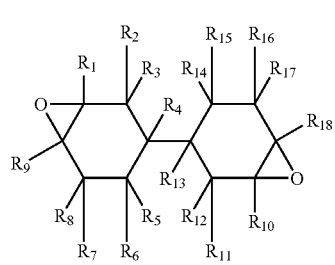

(1)

wherein, $R_1$-$R_{18}$, are the same or different from one another, and respectively represent a hydrogen atom, a halogen atom or a hydrocarbon group which may have a halogen atom, or an alkoxyl group which may have a substitution group.

2. The transparent hybrid sheet according to claim 1, wherein said alicyclic epoxy compound is obtained by epoxidizing alicyclic diene compound containing as a principal component thereof bicyclohexyl diene compound represented by Formula (3) below which is obtained by a dehydration reaction of dihydroxy bicyclohexyl compound represented by Formula (2) below in an organic solvent under presence of a dehydrating catalyst, with concurrent distillation-removal of water byproduced:

[Formula 2]

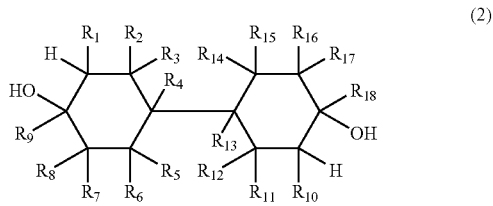

(2)

wherein, $R_1$-$R_{18}$, are the same or different from one another, and respectively represent a hydrogen atom, a halogen atom or a hydrocarbon group which may have a halogen atom, or an alkoxyl group which may have a substitution group;

[Formula 3]

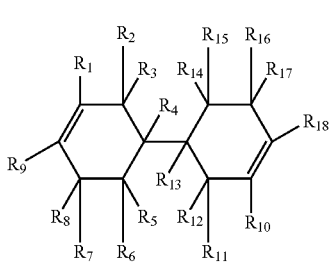

(3)

(where, $R_1$-$R_{18}$, are the same or different from one another, and respectively represent a hydrogen atom, a halogen atom or an oxygen atom, or a hydrocarbon group which may have a halogen atom, or an alkoxyl group which may have a substitution group).

3. The transparent hybrid sheet according to claim 1, wherein said curing agent contains a cationic curing catalyst.

4. The transparent hybrid sheet according to claim 1, wherein said epoxy resin composition contains a compound capable of cationic polymerization.

5. The transparent hybrid sheet according to claim 4, wherein said compound capable of cationic polymerization is at least a compound selected from the group consisting of a compound having an epoxy group, a compound having an oxetanyl group, and a compound having a vinyl ether group.

6. The transparent hybrid sheet according to claim 1, wherein the amount of the filler contained therein ranges from 1 to 90 wt. % relative to the transparent hybrid sheet.

7. The transparent hybrid sheet according to claim 1, wherein a difference between a refraction index after the curing of said epoxy resin composition and a refraction index of said glass filler is 0.01 or less.

8. The transparent hybrid sheet according to claim 1, wherein said glass filler comprises glass fiber cloth.

9. The transparent hybrid sheet according to claim 1, wherein said transparent hybrid sheet has a light transmittance at 400 nm wavelength of 80% or more.

10. The transparent hybrid sheet according to claim 1, wherein said transparent hybrid sheet has an average linear expansion coefficient at 30° C. to 250° C. of 40 ppm or less.

11. A display device substrate comprising the transparent hybrid sheet according to any one of claims 1-10.

* * * * *